US011892113B2

(12) United States Patent
Seibi et al.

(10) Patent No.: US 11,892,113 B2
(45) Date of Patent: *Feb. 6, 2024

(54) DEVICE AND METHOD FOR DETECTING LEAKS AND HEALING PIPELINES USING TWIN BALLS TECHNOLOGY

(71) Applicant: University of Louisiana at Lafayette, Lafayette, LA (US)

(72) Inventors: Abdennour Seibi, Lafayette, LA (US); Wadie Chalgham, Lafayette, LA (US)

(73) Assignee: University of Louisiana at Lafayette, Lafayette, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/378,135

(22) Filed: Jul. 16, 2021

(65) Prior Publication Data
US 2022/0003351 A1    Jan. 6, 2022

Related U.S. Application Data

(63) Continuation of application No. 16/133,155, filed on Sep. 17, 2018, now Pat. No. 11,098,836.
(Continued)

(51) Int. Cl.
*F16L 55/1645* (2006.01)
*G01M 3/24* (2006.01)
(Continued)

(52) U.S. Cl.
CPC ..... *F16L 55/16455* (2013.01); *F16L 55/1645* (2013.01); *G01M 3/243* (2013.01);
(Continued)

(58) Field of Classification Search
CPC ............. F16L 55/16455; F16L 55/1645; F16L 2101/30; F16L 2101/60; G01M 3/243; G01M 3/246
(Continued)

(56) References Cited

U.S. PATENT DOCUMENTS 3,762,446 A * 10/1973 Tungseth ............... G01M 3/005
73/40.5 R
4,375,763 A * 3/1983 Hogan .................. G01M 3/005
73/40.5 R
(Continued)

OTHER PUBLICATIONS

Fletcher et al., "SmartBall—A New Approach in Pipeline Leak Detection", proceedings of IPC2008 (Year: 2008).*

*Primary Examiner* — Nathaniel T Woodward
(74) *Attorney, Agent, or Firm* — Kean Miller LLP; Russel O. Primeaux; Jessica C. Engler

(57) ABSTRACT

The disclosed invention provides a device and method to detect leaks in pipelines and heal them instantly using twin ball technology. The device comprises two twin balls of novel construction inserted into the pipeline. The sensor ball receives acoustical data through internal sensors. Once the threshold of the sound level is surpassed, the smart ball will send a signal to the second flowing ball. The second ball will flow towards the leaking outlet and eject a healing fluid to close the leak and prevent further damage. The sensor ball will also alert the user to the size and location of the leak via Wi-Fi monitoring and text messaging. This twin balls technology could be used in pipelines of varying sizes and flow rates.

14 Claims, 15 Drawing Sheets

Related U.S. Application Data

(60) Provisional application No. 62/560,237, filed on Sep. 19, 2017.

(51) Int. Cl.
*F16L 101/30* (2006.01)
*F16L 101/60* (2006.01)

(52) U.S. Cl.
CPC ......... *G01M 3/246* (2013.01); *F16L 2101/30* (2013.01); *F16L 2101/60* (2013.01)

(58) Field of Classification Search
USPC .......................................... 73/49.1
See application file for complete search history.

(56) References Cited

U.S. PATENT DOCUMENTS

| | | | | |
|---|---|---|---|---|
| 4,572,228 | A * | 2/1986 | Larson | G01M 3/2853 137/355.27 |
| 5,497,807 | A * | 3/1996 | Rogers | F16L 55/1645 264/269 |
| 6,024,515 | A * | 2/2000 | Konwinski | F16L 55/1657 264/269 |
| 7,926,516 | B2 * | 4/2011 | Wilson | F16L 55/163 264/269 |
| 10,451,210 | B2 * | 10/2019 | Wu | F16L 55/40 |
| 2011/0000567 | A1 * | 1/2011 | Iwasaki-Higbee | F16L 55/16455 405/150.2 |
| 2012/0204624 | A1 * | 8/2012 | El Ferik | G01M 3/005 73/40.5 R |
| 2017/0234759 | A1 * | 8/2017 | Youcef-Toumi | G01M 3/2807 73/40.5 R |

* cited by examiner

DEVICE AND METHOD FOR DETECTING LEAKS AND HEALING PIPELINES USING TWIN BALLS TECHNOLOGY

CROSS REFERENCE TO RELATED APPLICATIONS

This application is a continuation of U.S. Non-Provisional application Ser. No. 16/133,155 filed on Sep. 17, 2018, which claimed priority to U.S. Provisional Application No. 62/560,237 filed on Sep. 19, 2017.

STATEMENT REGARDING FEDERALLY SPONSORED RESEARCH OR DEVELOPMENT

Not applicable.

REFERENCE TO A "SEQUENCE LISTING", A TABLE, OR COMPUTER PROGRAM

Not applicable.

DESCRIPTION OF THE DRAWINGS

The drawings constitute a part of this specification and include exemplary examples of the DEVICE AND METHOD FOR DETECTING LEAKS AND HEALING PIPELINES USING TWIN BALLS TECHNOLOGY, which may take the form of multiple embodiments. It is to be understood that in some instances, various aspects of the invention may be shown exaggerated or enlarged to facilitate an understanding of the invention. Therefore, drawings may not be to scale.

FIELD OF THE INVENTION

Figure 1:
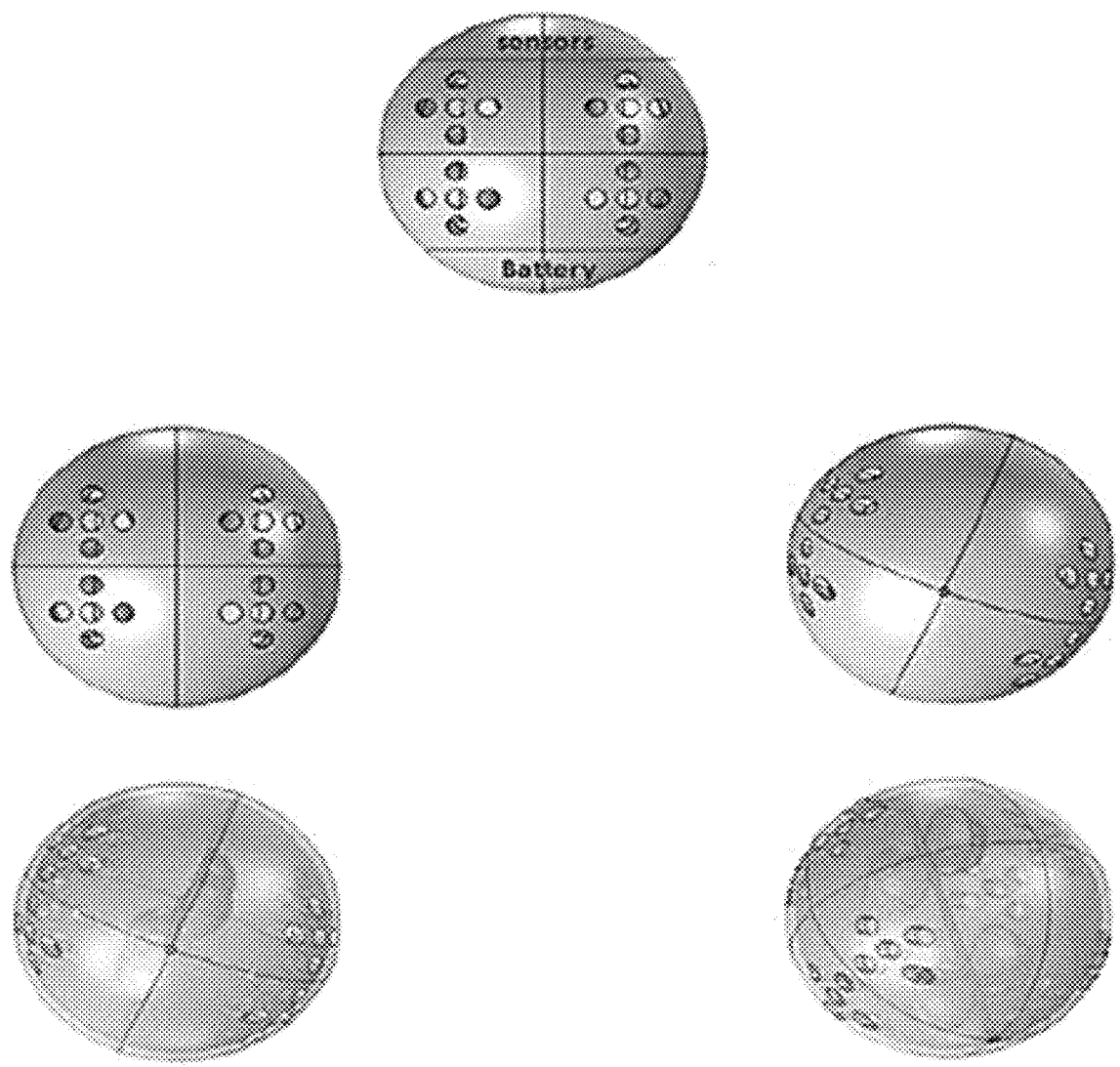
FIG. 1 provides one view of one embodiment of the smart ball outer shell, an alternative view of one embodiment of the smart ball outer shell, one view of one embodiment of the smart ball outer shell, an alternative view of one embodiment of the smart ball outer shell, provides an alternative view of one embodiment of the smart ball outer shell wherein the outer shell 1 is drawn in a translucent manner to show the rotating axle 8 and blades 9 contained within the smart ball, and an alternative view of the smart ball.

The field of the invention is pipeline operations. More specifically, the invention relates to the monitoring of leaks in pipelines and detection and repair of said leaks using independently-propelled rechargeable acoustic-sensor based detection system.

BACKGROUND OF THE INVENTION

The use of pipelines has always caused many environmental risks such as explosions or flooding due to undetected leaks; thereby, inducing high financial losses. Each day, leaking pipes lose more than 7 billion gallons of clean drinking water resulting in $11 billion in loss per year from water alone (James, A., "The U.S. Wastes 7 Billion Gallons of Drinking Water a Day: Can Innovation Help Solve the Problem?", *Climate Progress, Think Progress* (2011)). These losses may also cause severe human injuries and death. The U.S. Department of Transportation reported that 623 gas and hazardous liquid pipeline incidents happened in 2013 that resulted in 10 fatalities, 47 injuries and an estimated cost of $336 million in property damage (Calder, B., "Technologies Mimic the 5 Senses to Monitor Pipelines", *Intel Free Press* (2014)). Leaks can be very dangerous and even catastrophic if they are not detected beforehand.

Many techniques have been developed to execute pipeline inspection. These tools include the Smart Ball leak detection tool by Pure Technologies, Ltd. (Garcia, R., "SmartBall, Free Swimming Leak Detection Tool for Large Diameter Pipelines, Pure Technologies, Ltd.", *Water Leakage Summit, Atlantis Report*, Palm Jumeirah, UAE (2011)); the Sahara device (Mergelas, B., Bond, A., and Laven, K., "Financial Benefits from Seven Years of Water Loss Control Utilizing the Sahara System at Thames Water in the United Kingdom. *Proceedings of ASCE Pipelines* 2006, Chicago, Illinois, USA (2006)); Ultrasonic Intelligent Pigging (Carlson, M. and Henke, J., "Drinking Water Pipeline Condition Assessment", *PNWS-AWWA Conference*—Spokane, WA (2013)); the LDS1000 platform (JD7 Tech, "LDS1000—The Ultimate Investigation and Leakage Platform, jd7us (2013)); and Acoustic Fiber Optic Monitoring (AFO) (Paulson, P. and Mascarenhas, R., "Acoustic Signal Processing for Pipe Condition Assessment", *Water Research Foundation, Web Report* #4360 (2014)). No single system is universally accepted as a preferred method because all adopted methods still present some shortcomings and limitations. Additionally, most methods can be costly and none can reliably detect small leaks regardless of their location in the pipeline. Further, the majority of pipelines are typically inspected at intervals of several years, and all currently existing techniques have some limitations related to detecting in-situ defects.

For the Smart Ball, ambient noise may be identified during the data analysis as a leak because it contains the same acoustic signals as small leaks. This technology also has a low sensitivity since it cannot detect leaks in pipelines that operate at pressures less than 10 psi and a low accuracy of +/−6 feet or +/−2 meters. Further, the Smart Ball emits acoustic signals every 3 seconds, which generate an incorrect leak location or no leak detection if the flow rate of the fluid in the pipe is high. The Smart Ball also operates on batteries with limited working ranges; thereby, becoming of inconvenient use for continuous real time data (Gernad, J. and Ojala, O., "SmartBall Inspection Report of North Beach Force Main", *Pure Americas Inc. Inspection for King County Wastewater Treatment Division,* Seattle, WA (2011)).

For Sahara, the installation of sensors requires service interruption and the survey length is limited by the extent to which the tether cable can be deployed inside the pipeline. This typically limits the survey length to less than 1.5 km. Tethered systems also require numerous access points, and frequent reinsertion of the system over an extended distance and the civil works required made this tool expensive to operate. (Carlson, M. and Henke, J., 2013).

Ultrasonic Intelligent Pigging also has its drawbacks. This tool was not designed to differentiate between leaks and deep wall defects. Also, large insertion assemblies and extensive cleaning are required to use this tool. This tool is also limited to ferrous pipes only and is expensive to operate. (Carlson, M. and Henke, J., 2013).

For LDS1000, the defect location is approximate and a tethered system for retrieval is needed. This tool further requires use of large assemblies with difficult and time-consuming installations (JD7 Tech, 2013).

For Acoustic Fiber Optic Monitoring the installation and ongoing monitoring cost is significant, totaling up to $64,000 per mile and up to $150,000 for hardware monitoring cost, making this solution prohibitively expensive for many potential users (Ariaratnam, S. T. and Chandrasekaran, M., "Development of a Free-Swimming Acoustic Tool for Liquid Pipeline Leak Detection Including Evaluation for Natural Gas Pipeline Applications", *Pure Technologies Presentation for US DOT PHMSA* (2010)).

Furthermore, since all presently known tools are not autonomous and self-recharging, additional costs are associated with tools retrieval, additional man power, and battery replacement. In addition, harsh working conditions like rain or snow will prevent the working team form installing these tools; thereby increasing the non-productivity time of these inspection tools.

SUMMARY OF THE INVENTION

The disclosed invention provides a device and method to detect leaks in pipelines and heal them instantly using twin ball technology. The device comprises two twin balls of novel construction inserted into the pipeline. The sensor ball receives acoustical data through internal sensors. Once the threshold of the sound level is surpassed, the smart ball will send a signal to the second flowing ball. The second ball will flow towards the leaking outlet and eject a healing fluid to close the leak and prevent further damage. The sensor ball will also alert the user to the size and location of the leak via Wi-Fi monitoring and text messaging. This twin balls technology could be used in pipelines of varying sizes and flow rates.

DETAILED DESCRIPTION OF THE INVENTION

One embodiment of the utilized balls (hereinafter "smart balls") is show in FIG. 1. In the preferred embodiment, the smart balls are spherical, self-recharging untethered balls capable of flowing inside pipelines. While the preferred shape of the smart ball is a sphere, additional embodiments can make use of other shapes that would operate similarly and produce similar results. The smart balls are fully autonomous and do not need any battery changes due to the use of internal built-in blades. The blades, which can be seen in FIG. 2 use the force of the flow to rotate and generate a magnetic field that will induce a current. The blades are propelled by the moving fluid inside the pipeline to generate a magnetic field, thereby inducing an electric current to recharge the battery. Thus, as long as the ball is propelled inside the pipeline by the fluid motion, the ball will be self-recharged. By having an autonomous power supply, the device will provide data in real-time via Wi-Fi, improving the efficiency of the device. The smart balls are equipped with the necessary sensors to be able to detect any leaks through acoustic waves, and immediately send signals to the supervisors once a leak is detected.

FIGS. 1(a)-(c), depicts one embodiment of the design of the outer shell 1 of the smart balls from various angles. FIG. 1 shows the spherical shape of the smart balls as well as the multiple openings 2 that allow fluid to flow inside. In the embodiment shown in FIG. 1(a), the smart ball is divided into three sections: a top section 3, a bottom section 4, and a middle section 5. In this embodiment, the top section 3 holds the acoustic sensors 6 and the bottom section 4 holds the battery 7. The battery 7 is self-charged using the energy gained from the rotating blades moved by the fluid flow inside the middle section of the ball 5. As shown in FIGS. 1(d) and 1(e), the openings 2 are placed in such a way to achieve a maximal rotation velocity of the blades 9 and 10.

Figure 2:
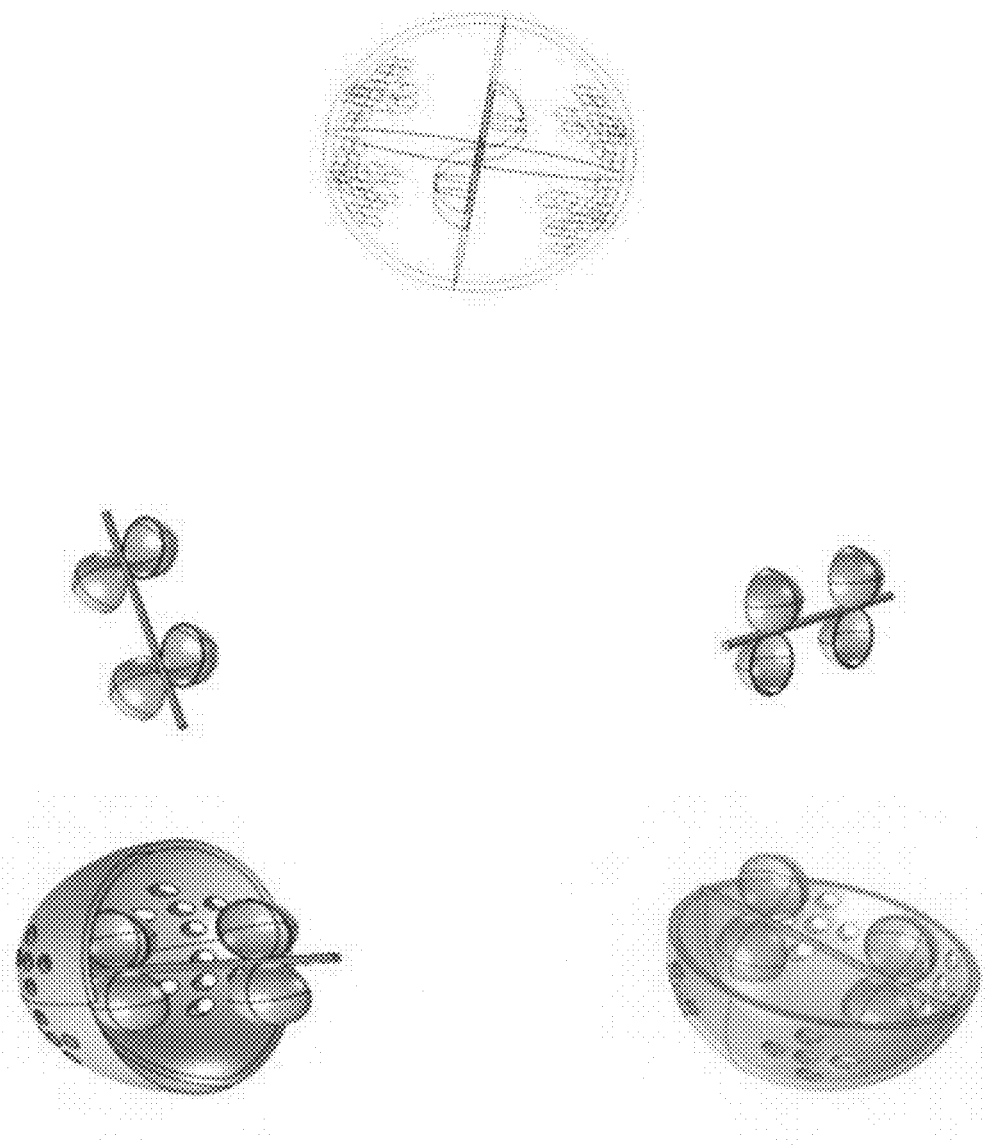
FIG. 2(a) provides an alternative view of one embodiment of the smart ball, including the outer shell 1, openings 2, rotating axle 8, and blades 9.
FIG. 2(b) provides the design of one embodiment of the rotating axle 8 and the blades 9.
FIG. 2(c) provides an alternative view of the design of one embodiment of the rotating axle 8 and the blades 9.
FIG. 2(d) provides a cross-section view of one embodiment of the smart ball showing a cross-section of the outer shell 1 and blades 9 on the rotating axle 8 that have been placed inside the smart ball.
FIG. 2(e) provides an alternative view of the embodiment displayed in FIG. 2(d).

FIG. 2 depicts the design of the rotating blades. FIG. 2 provides an embodiment in which four elliptical-shaped blades are attached to a rotating axle 8. The two top blades 9 are constructed using a different concave direction than the two lower blades 10, creating an S shape. In this embodiment, when fluid flows into the smart ball, the top blades 9 will be filled with fluid, creating a mass difference that induces angular momentum, enabling the rotation of the blades in a clockwise direction.

Figure 12:
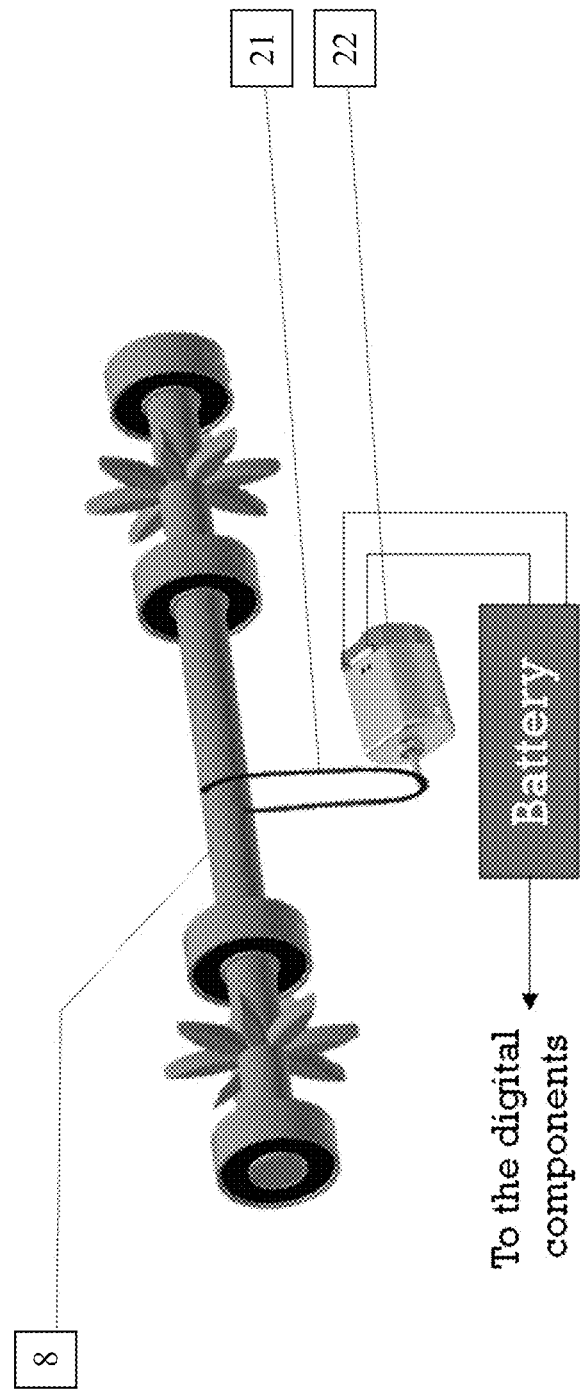
FIG. 12 depicts the energy harvesting mechanism.

FIG. 12 presents another embodiment of the rotating axle 8 in which a dynamo belt 21 and AC/DC converter 22 are used to convert the mechanical energy produced by the rotating axel 8. However, any conversion means may be used as known in the art.

In the embodiment, and as seen in FIG. 1(a)-(e), the openings 2 are created at a direction perpendicular to the rotation axle direction to achieve a maximal rotational velocity of the blades. To achieve maximal velocity, at least two opening should be present, wherein the first opening is located on the top side of the ball facing the inlet direction while the second opening should be located on the lower side of the ball facing the outlet direction.

Figure 13:
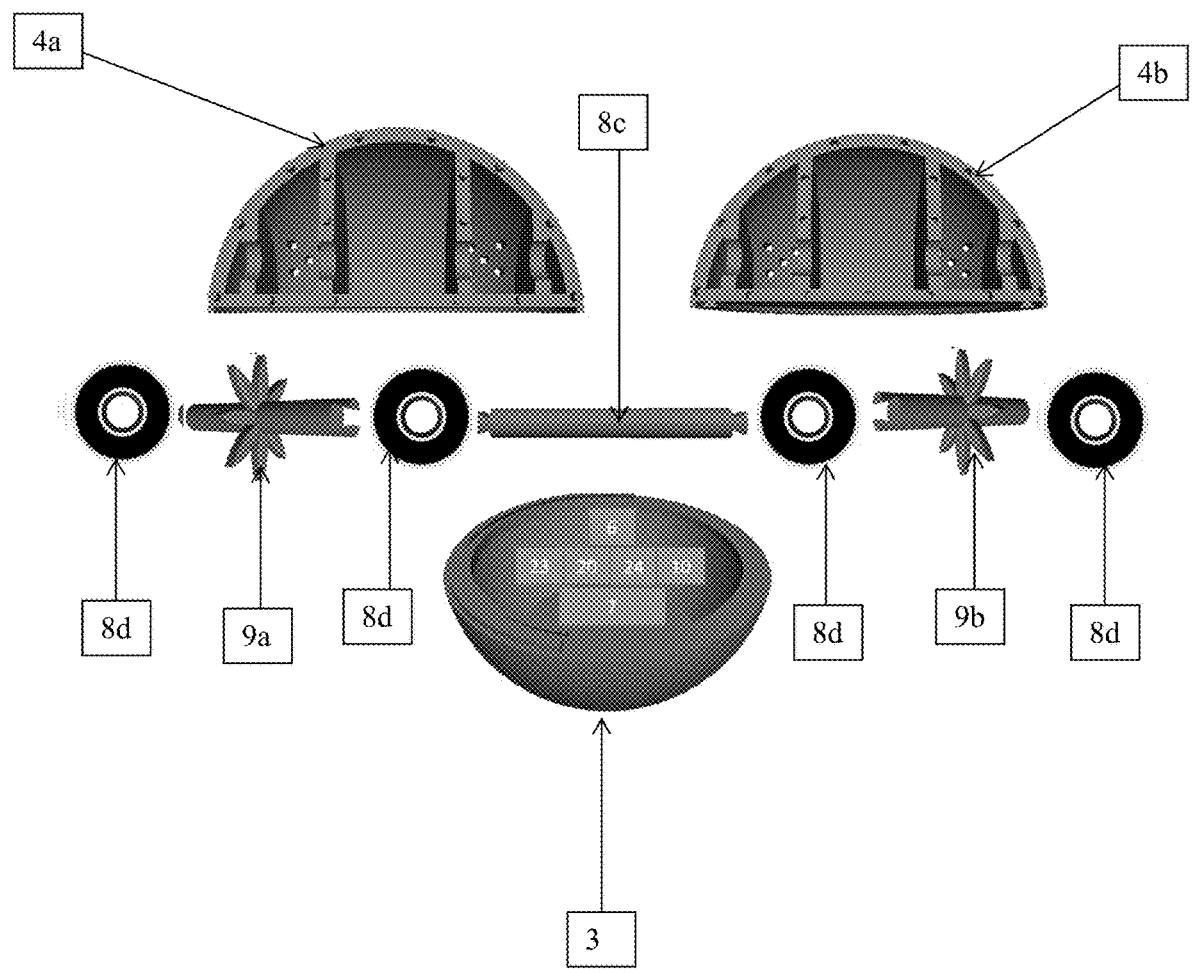
FIG. 13 is an exploded view of the sensor ball.

FIG. 13 further depicts the interior and mechanical couplings of the sensor ball. According to FIG. 13, the ball comprises a left side of the bottom section 4a, a right side of the bottom section 4*b*, and top section 3. In this embodiment, the rotating axel 8 further comprises two rotating blades 9*a*, 9*b*, a connecting rod 8*c*, and four ball bearings 8*d*. In this embodiment, the top section 3 contains digital components such as an acoustic sensor 6, IMU-enabled GPS 23, Wi-Fi emitter 20, control system 10, and battery 7. FIG. 13 depicts how these components might be arranged inside the ball. The IMU-enabled GPS 23 is an electric drive that combines accelerometers, gyroscopes, magnetometers, and a GPS.

Figure 14:
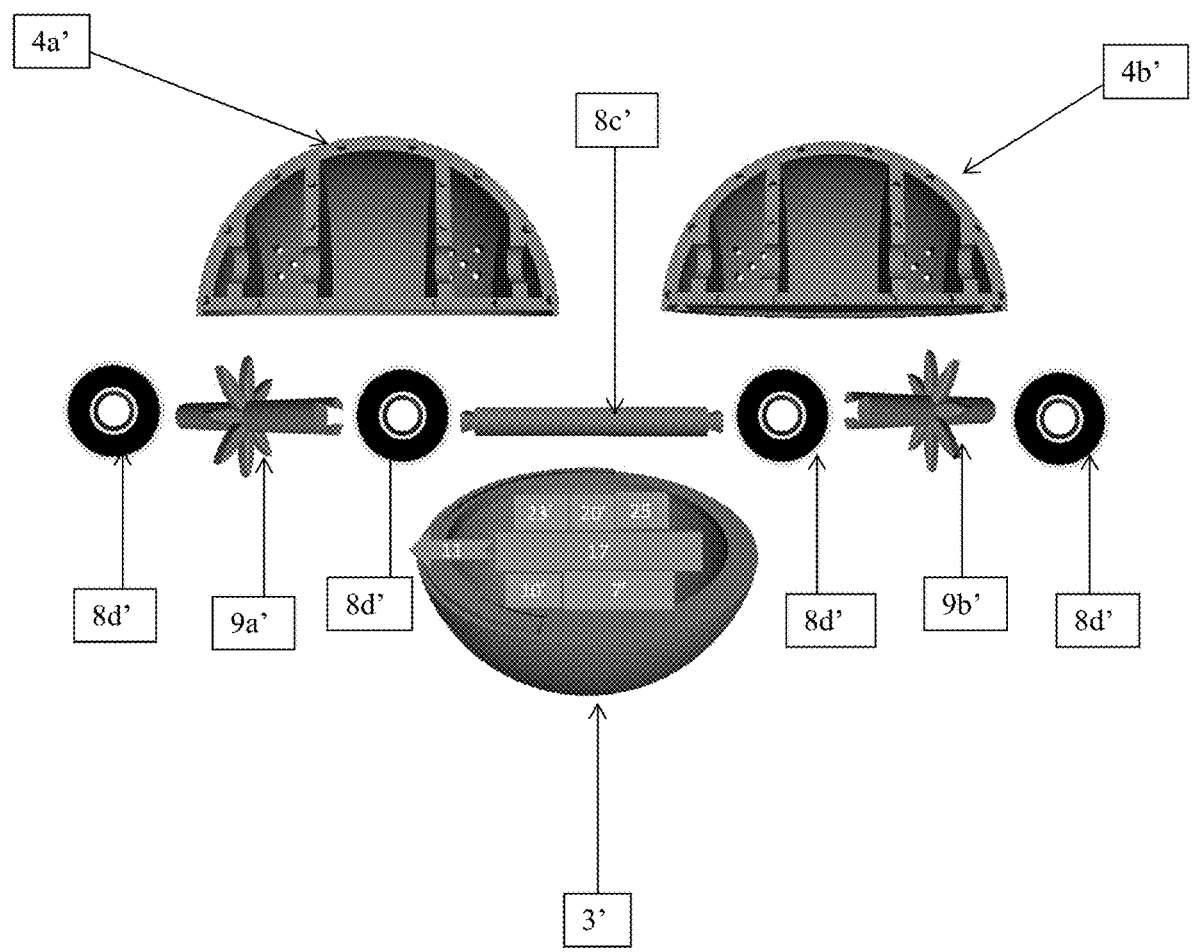
FIG. 14 is an exploded view of the healing ball.

FIG. 14 depicts the interior and mechanical couplings of the healing ball. Similar to FIG. 13, the second ball comprises a left side of the bottom section 4*a*', a right side of the bottom section 4*b*', and top section 3'. In this embodiment, the rotating axel 8' further comprises two rotating blades 9*a*', 9*b*', a connecting rod 8*c*', and four ball bearings 8*d*'. In this embodiment, the top section 3' contains digital components specific to the healing ball, including: a healing fluid tank 17 which houses the healing fluid 16, an ejector 11, IMU-enabled GPS 23', a Wi-Fi Emitter 20', a sonar receiver 25, a control system 10', and a battery 7'. FIG. 14 depicts how these components might be arranged inside the ball.

Figure 3:
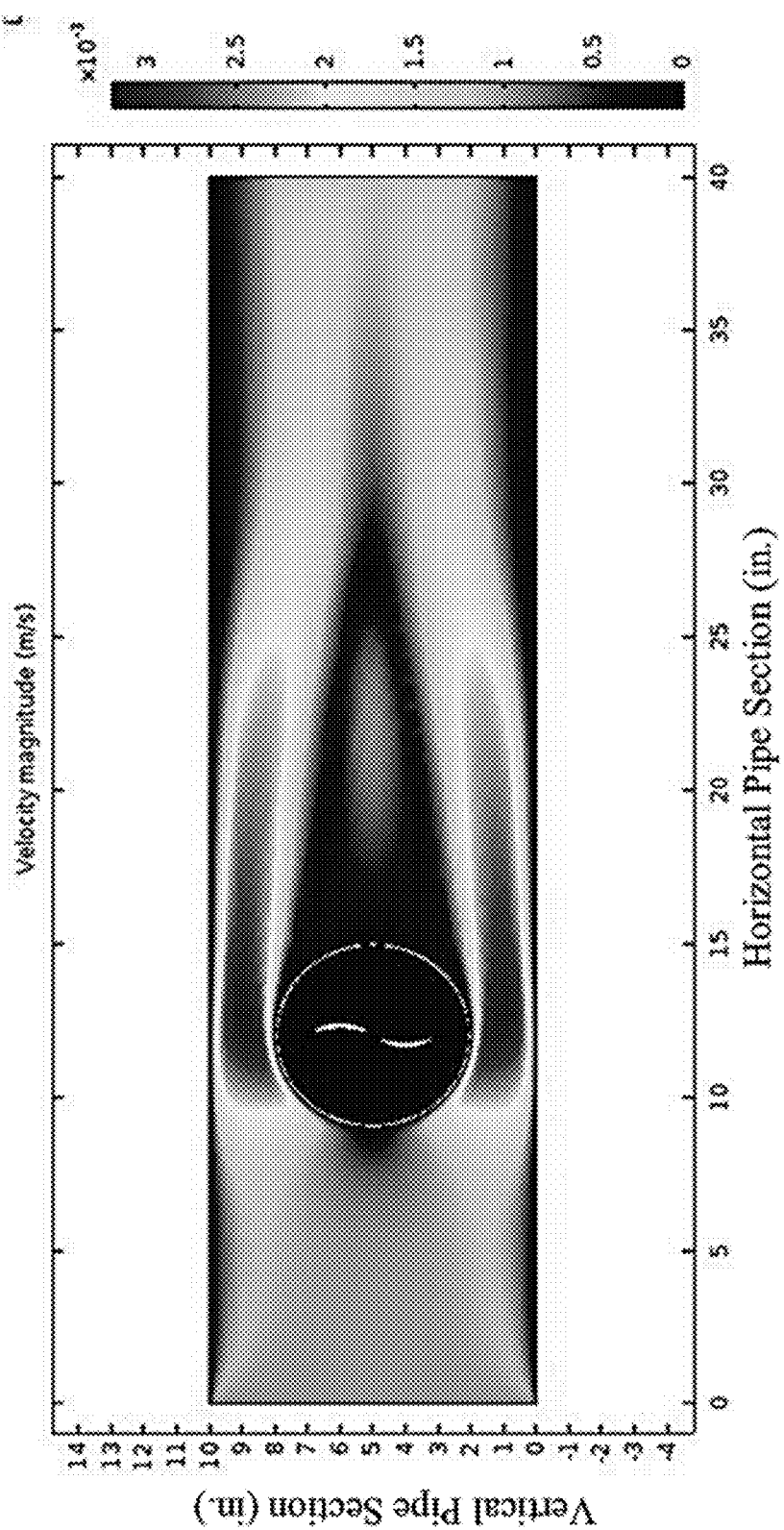
FIG. 3 shows the velocity profile of the fluid flowing inside a pipe having a spherical ball with no openings.
Figure 4:
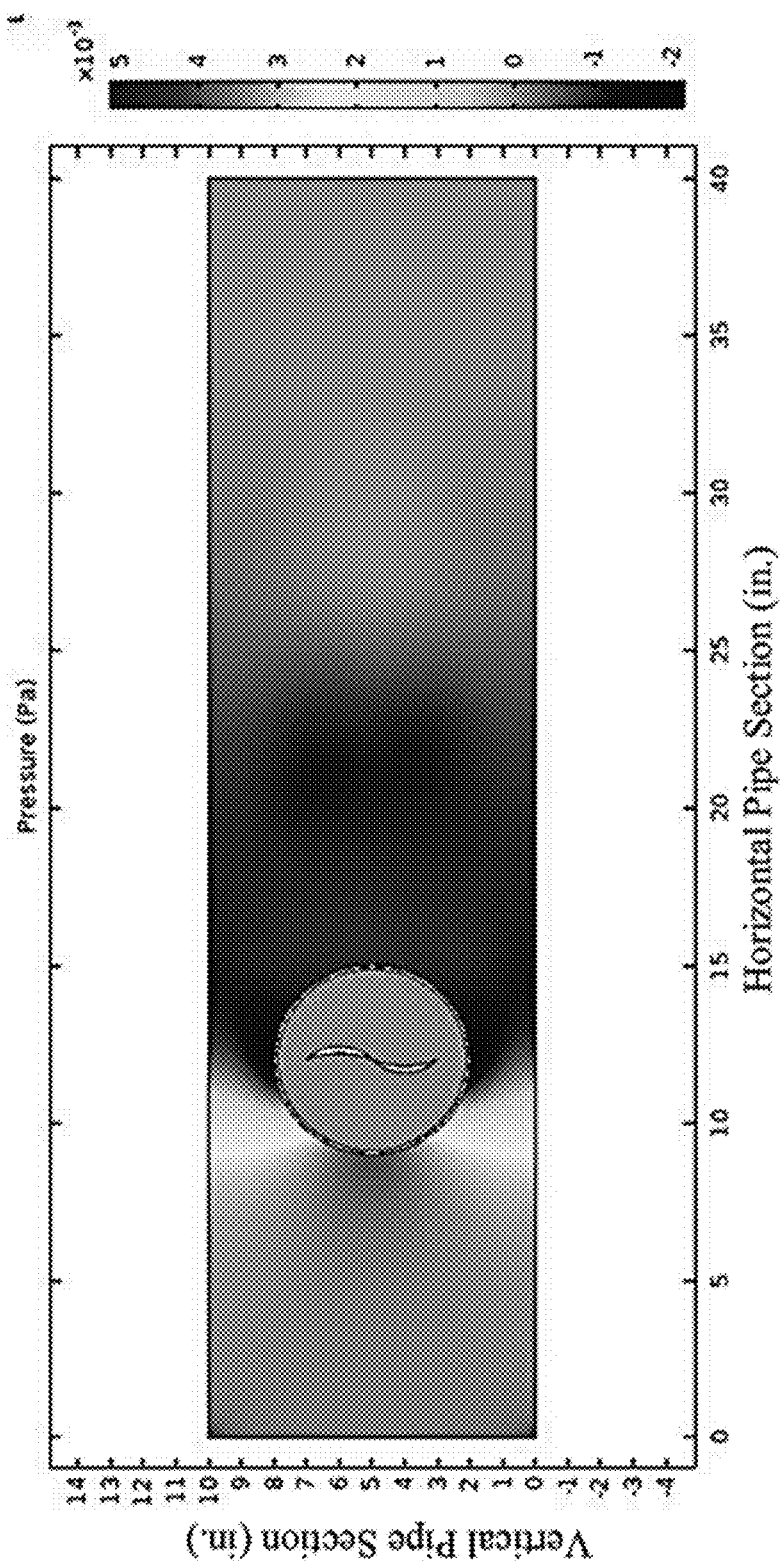
FIG. 4 presents the related pressure magnitudes and shows a zero pressure inside the ball since it does not have any openings.

The determination of the optimal location of the openings will now be described. The generation of energy created by the openings in the balls was tested numerically using water as the flowing fluid, pumped at an inlet velocity of 1 mm/s. Velocity and pressure profiles were generated. FIG. 3 shows the velocity profile of the fluid flowing inside a pipe containing one embodiment of a smart ball wherein the smart ball has no openings. The simulation shows how the velocity magnitude of the fluid inside the pipe increases around the ball from the upper and lower directions. FIG. 4 presents the related pressure magnitudes for the embodiment of the smart ball with no openings and shows a zero pressure inside the ball since it does not have any openings.

Figure 5:
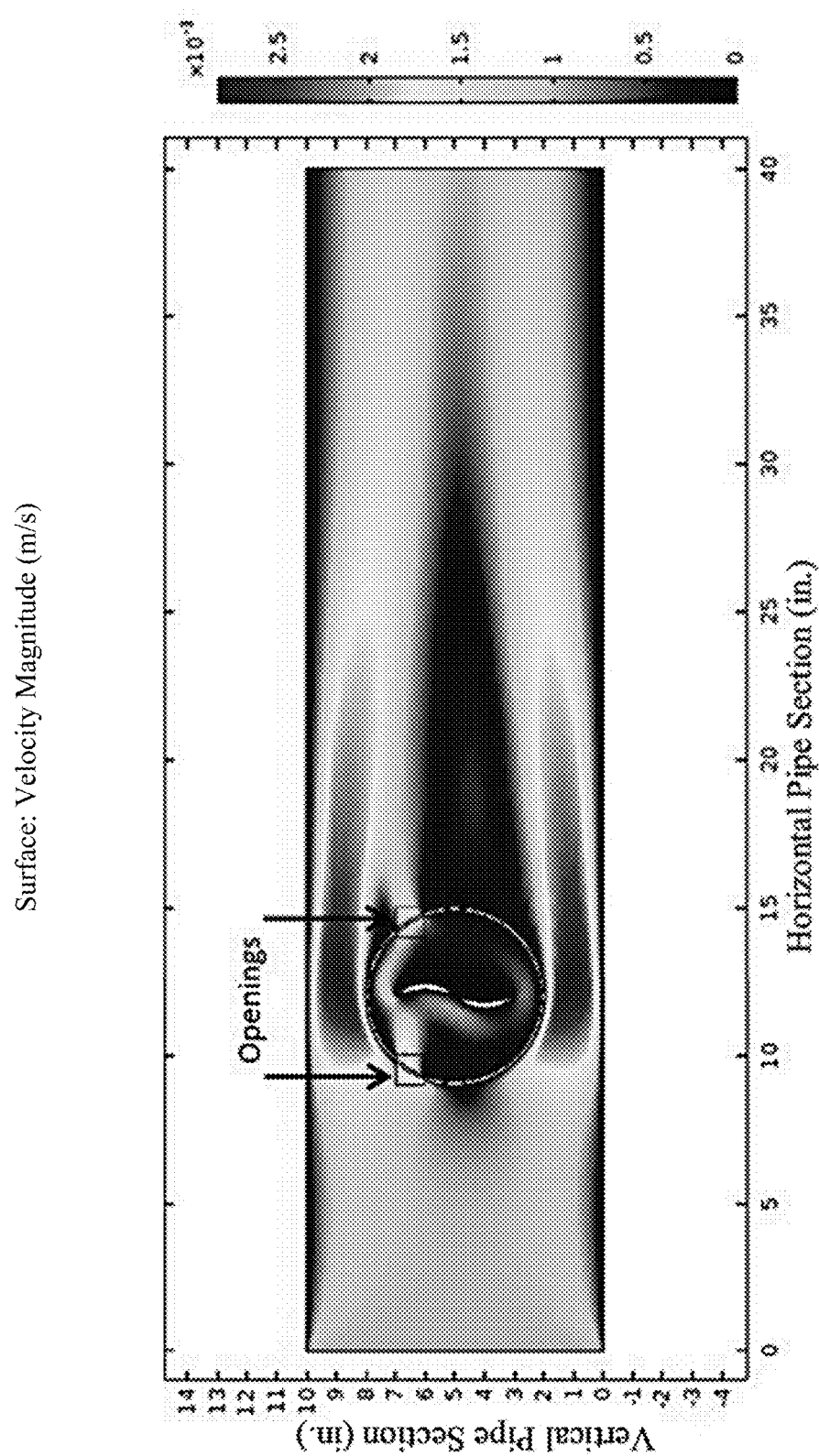
FIG. 5 two openings were placed at the top side of the ball. The openings in the depicted configuration enabled the fluid to flow inside the ball and raise the velocity magnitude beyond zero.
Figure 6:
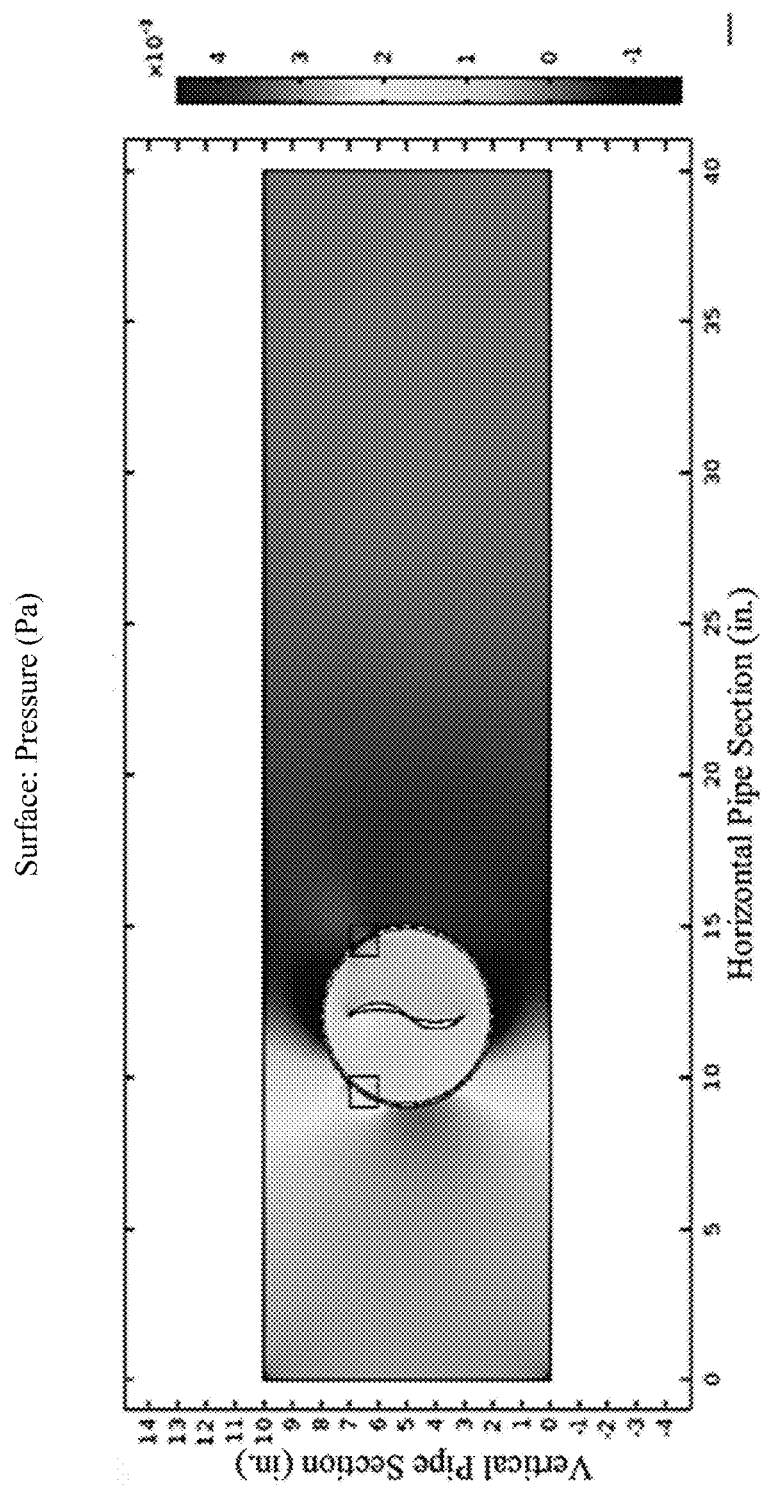
FIG. 6 presents the related pressure profiles and shows the high pressure build up at the edge of the top blade with a maximum value of 2 MPa, confirming the effect of openings on the rotation of the blades, in a clockwise direction.

For the embodiment of the smart ball utilized in the testing shown in FIG. 5, two openings were placed at the top section of the ball only. The openings enabled the fluid to flow inside the ball and raise the velocity magnitude beyond zero. FIG. 6 presents the related pressure profiles and shows the high pressure build up at the edge of the top blade with a maximum value of 2 MPa, confirming the effect of openings on the rotation of the blades, in a clockwise direction. The average velocity in sections 1 and 2 is estimated using the following equation:

$$V = \frac{1}{L}\int_0^L v(x)dx$$

The simulation results were used to calculate the angular velocity ω of the shaft-blade system, from which the rotational kinetic energy (KE=(½)Iω²) was estimated.

Figure 10:
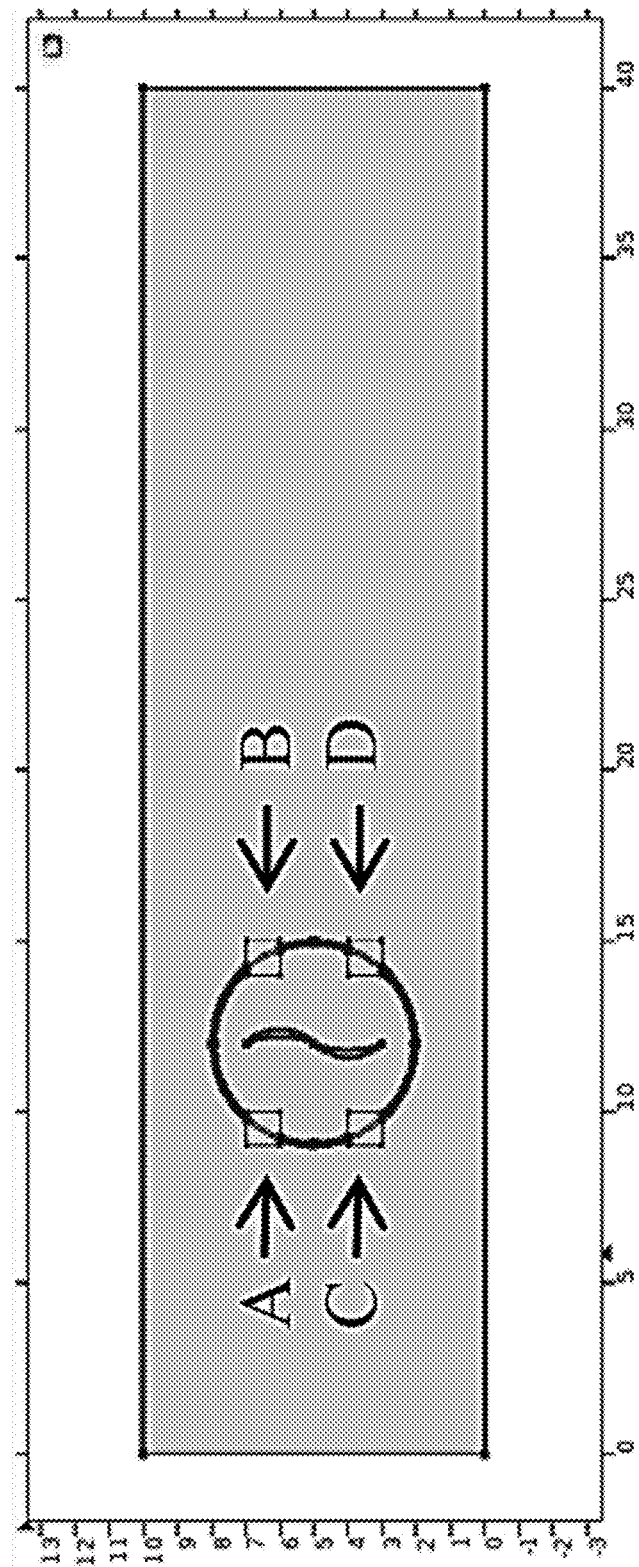
FIG. 10 depicts the location of various openings that can be placed on the ball.
Figure 11:
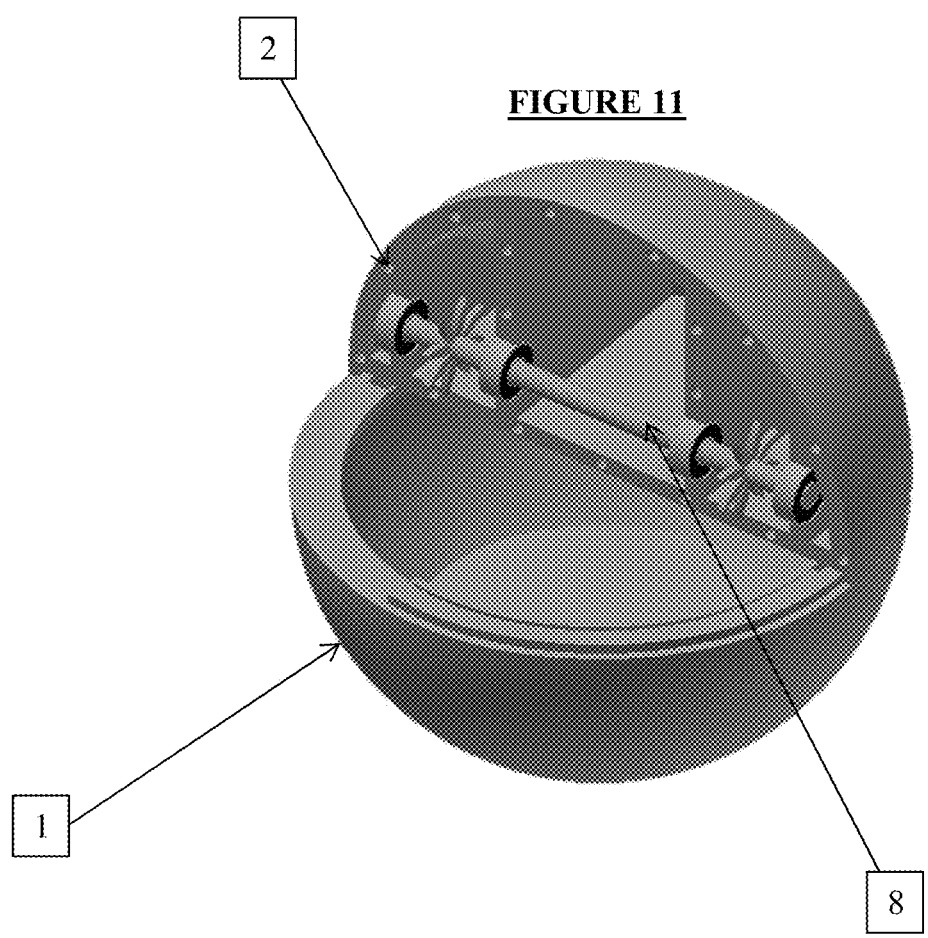
FIG. 11 depicts an overview of the outer shell of both balls.

The simulation results revealed that the highest energy gain G is present when the ball openings are located at points A and D, as shown in FIG. 10, with a highest recorded energy gain for an average speed difference of 0.5 mm/s. The energy gain G was calculated by measuring the change in velocity between two points along the simulated pipe traveled by the smart ball. The average angular velocity ω in rad/s of the blades around the axle was calculated by dividing the average fluid velocity by the radius of the curvature of the blades resulting in a value of 0.2 rev/min.

The rotational kinetic energy was also calculated to be 0.026 μJ. Assuming a small time period of 1 ns, the generated power in the blades in Watts is calculated to be 26 W. Therefore, in this preferred embodiment where the openings are at points A and D as depicted in FIG. 10 and the ball sensors, controls, and other parts are powered using a 12 V battery, the energy gained from the blades rotation will recharge the battery at a rate of 2.2 Amp (26 W/12V), which falls within the recommended range of battery charging practice. Those having ordinary skill in the art will recognize that there are other locations where the holes in the ball can be placed which may generate acceptable results depending on the particular application.

Figure 7:
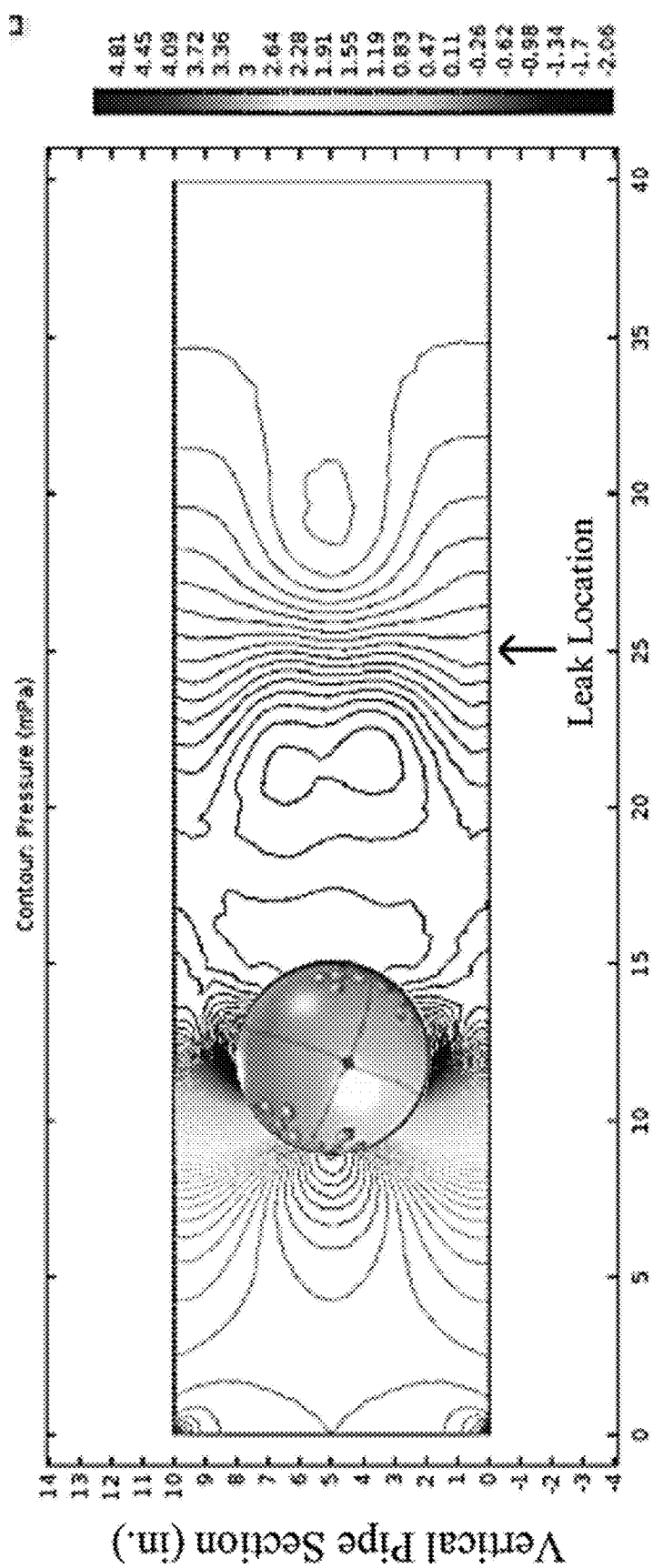
FIG. 7 shows the simulated pressure profile of the fluid flowing inside of the pipe in case of a leak.
Figure 8:
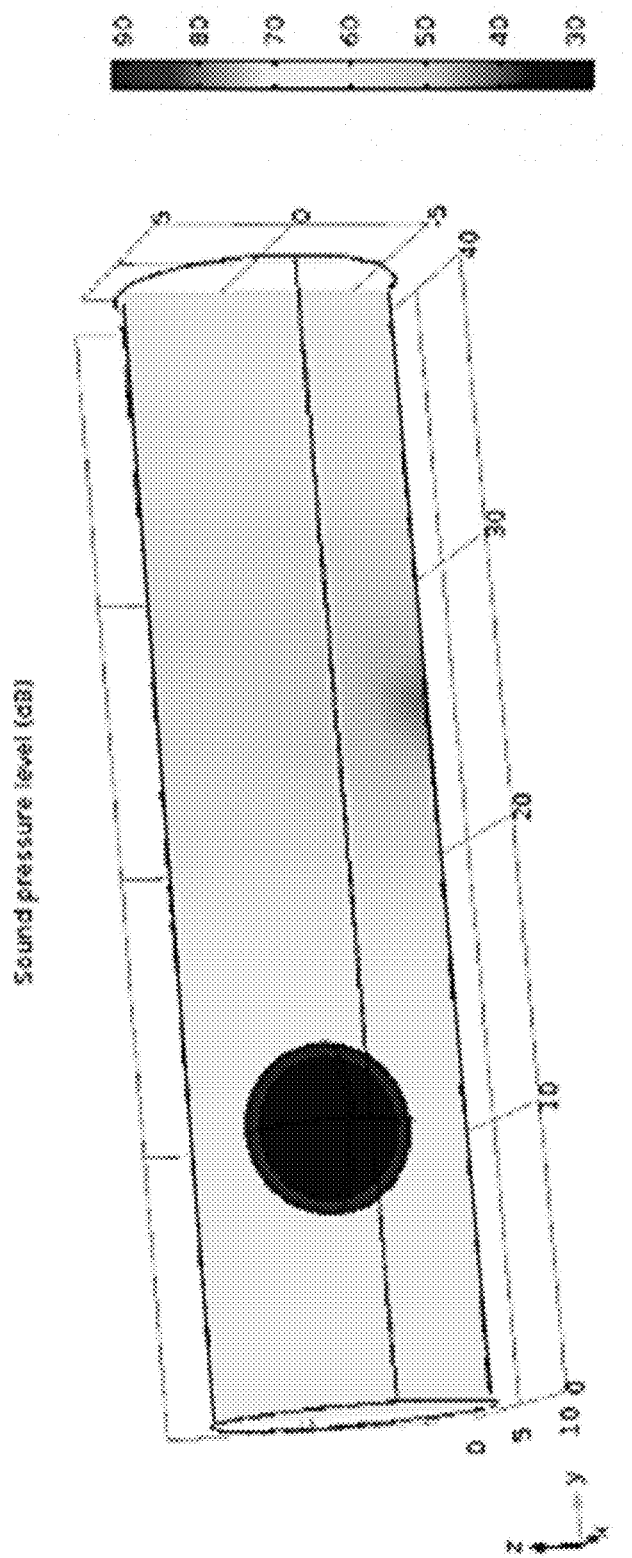
FIG. 8 shows a plot of the pressure distribution along a horizontal pipe section. Leak is located at 2 inches below the ball.

The control system of the disclosed sensing ball can be calibrated by analyzing the velocity and pressure profiles around the ball. FIG. 7 shows the simulated pressure profile of the fluid flowing inside the pipe in case of a leak. The simulation shows how the pressure reduces significantly when the fluid flows around the spherical ball. FIG. 8 shows a plot of the pressure distribution along a horizontal section below the ball, at an elevation of 2 inches. The plots demonstrate that the pressure difference is negligible inside the pipe except around the ball and near the location of 25 inches. Also, the plots illustrate how the pressure magnitudes decrease significantly around the ball location, reaching negative magnitudes that could be explained by the high fluid velocity at this location. Moreover, the pressure tends to increase after the ball location reaching a positive magnitude again after 25 inches. FIG. 8 further shows the simulated results of acoustic propagation from the leak location and how the magnitude of the sound pressure level decreases as it gets away from the leak location.

Figure 9:
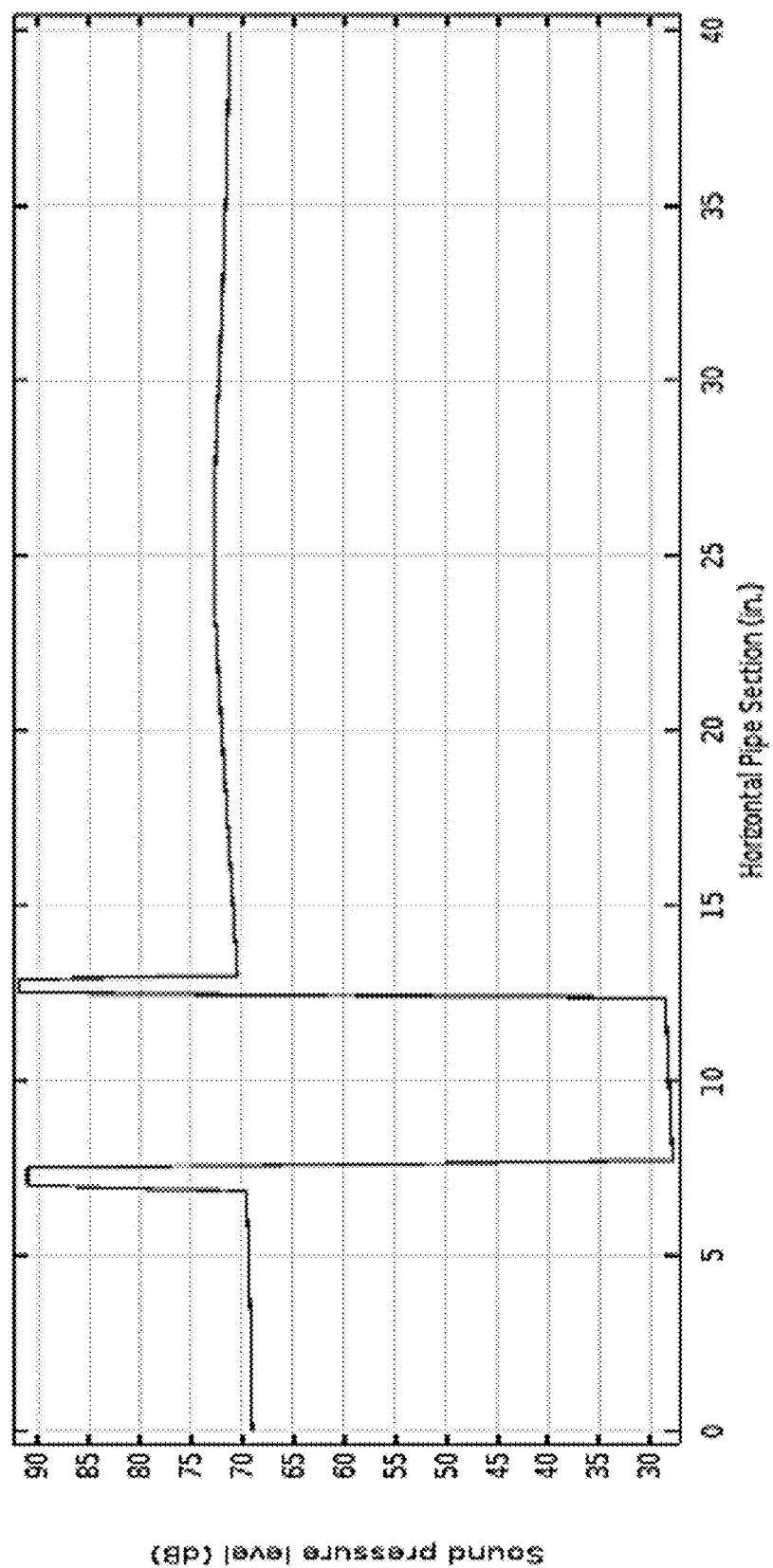
FIG. 9 presents a plot of the sound pressure level propagation in decibel (dB) at the centerline of the pipe.

In the preferred embodiment, the smart ball is constructed from steel. The simulation shows how the sound pressure level increases in the steel layer and decreases inside the spherical ball. In fact, steel has higher density compared to water and air, which allows it to have higher pressure levels. FIG. 9 presents a plot of the sound pressure levels propagation in decibel (dB) at the centerline of the pipe. The results from FIG. 9 show how the sound level increases at the leak location of 25 inches and then decreases and peaks again at the ball location. At the steel outer lawyer of the ball, the sound pressure level increased by 20 dB from 72 to 92 dB, an increase caused by the higher density of steel. The sound pressure level at the rear side of the ball has a magnitude of 91 dB, a 1 dB lower than the value at the front side of the ball.

While the preferred embodiment of the sensor ball has been disclosed, nothing in this disclosure shall be interpreted to indicate that this specific design is the only design that will generate desired results.

The sensor ball records continuously the sound level in the pipeline using the embedded acoustic sensor and sends this data (including the ball location) via Wi-Fi to a control room for data visualization.

Figure 15:
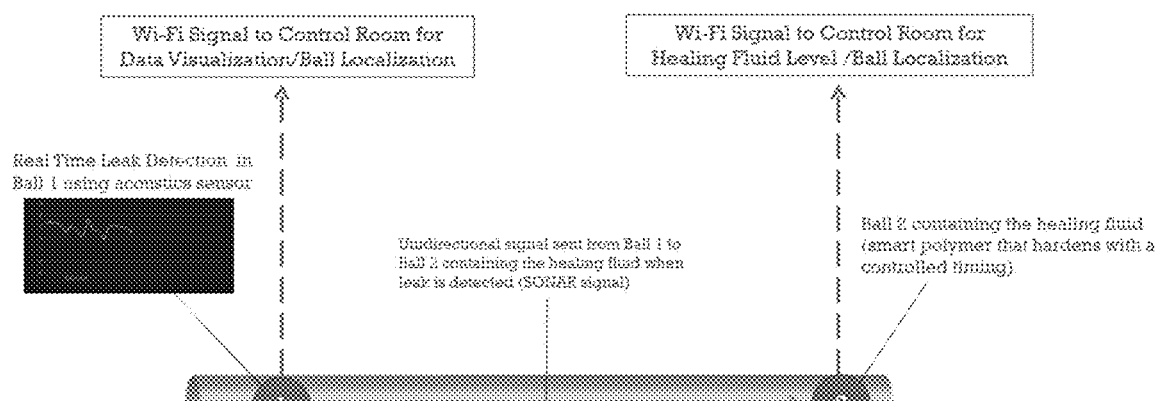
FIG. 15 is a diagram depicts the method of a first smart ball detecting the leak and the second smart ball healing the leak

The second smart ball, which is tasked with sealing leaks, comprises an ejector 11 and associated machinery known in the art in order to allow the second smart ball (the healing ball) to release the healing fluid. Once the threshold sound level is surpassed as detected by the sensor ball, it will send a SONAR signal to the healing ball which will eject the healing fluid, which will flow towards the leaking outlet and close it instantly, preventing any further damages. One embodiment of this process is depicted in FIG. 15.

In other embodiments, the signal provided to the healing ball is a Bluetooth signal. In other embodiments, the signal is a Zigbee signal. In yet other embodiments, the signal is Wi-Fi. In other embodiments still, the signal varies depending on the type of the flowing fluid and pipeline properties.

In other embodiments, the smart balls may be connected by physical means. This is especially advantageous when the properties of the fluid and/or pipe create a difficult environment for transmitting signals, e.g., pipe location or depth. The two balls can be connected together by a cable. In that embodiment, rollers may be added to the outer shell of the smart balls for stability.

The healing fluid is a smart polymer that hardens with a controlled timing to allow the closure of the crack or hole that caused the leak. In one embodiment, the healing ball has an embedded Wi-Fi system that allows it to send the ball localization and the healing fluid level data to a control room for operator monitoring.

The healing ball is released so as to allow enough time for the signal from the sensor ball to reach the healing ball and for the healing ball to process the signal, as determined by the user. In one embodiment, the smart balls are released within 3 meters of each other. However, depending on the pipe conditions, other distances may suffice. In one or more embodiments, the determined distance can be changed and calibrated with a timing delay in the control system embedded in the healing ball.

In one or more embodiments, multiple sets of the two balls (sensor ball and healing ball) can be deployed in the same pipeline as desired by the user. At the end of the line, both ball can be retrieved for maintenance, recharging, and/or refilling the healing fluid.

The described features, advantages, and characteristics may be combined in any suitable manner in one or more embodiments. One skilled in the relevant art will recognize that the various components of this design may be practiced without one or more of the specific features or advantages of a particular embodiment. In other instances, additional features and advantages may be recognized in certain embodiments that may not be present in all embodiments.

Reference throughout this specification to "one embodiment", "an embodiment", or similar language means that a particular feature, structure, or characteristic described in connection with the embodiment is included in at least one embodiment. Thus the appearance of the phrase "in one embodiment", "in an embodiment", and similar language throughout this specification may, but do not necessarily, all refer to the same embodiment.

The invention claimed is:

1. A system for detecting and healing leaks in pipes comprising:
    at least two smart balls, each comprising:
        an outer shell, comprising at least two openings;
        a battery;
        at least two blades;
        a rotating axle;
        a control system; and
        a wireless communication mechanism;
    wherein one of the at least two smart balls is a sensor ball; and
    wherein one of the at least two smart balls is a healing ball.

2. The system of claim 1, wherein the sensor ball further comprises at least one acoustic sensor.

3. The system of claim 1, wherein the healing ball further comprises:
    a receiver;
    an ejector;
    a healing fluid tank; and
    a healing fluid.

4. The system of claim 1, wherein, for each smart ball, at least two of the blades are placed on an end of the rotating axle.

5. The system of claim 1, wherein, for each smart ball, at least two of the blades are placed on an upper end of the rotating axle, forming an upper blade orientation and at least two of the blades are placed on a lower end of the rotating axle, forming a lower blade orientation.

6. The system of claim 5, wherein, for each smart ball, the blades of the upper blade orientation have an opposite concave direction than the blades of the lower blade orientation.

7. The system of claim 1, wherein, for each smart ball, at least one opening is located on an upper side of the smart ball facing an inlet direction and at least one opening is located on a lower side of the ball facing an outlet direction.

8. A method for detecting and healing leaks in pipelines comprising:
    (a) flowing a fluid through a pipeline;
    (b) placing at least one sensor ball and at least one healing ball inside the pipeline, wherein the sensor ball and healing ball each have at least two openings;
        wherein the sensor ball and healing ball each comprise a rotating axle and at least two blades; and
        wherein the sensor ball further comprises an acoustic sensor;
    (c) flowing the fluid through the openings of the sensor ball and the openings of the healing ball; and
    (d) filling the blades of the sensor ball and the blades of the healing ball with fluid to propel the sensor ball and the healing ball through the pipeline.

9. The method of claim 8, further comprising:
    (a) reading the acoustics of the pipeline by an acoustic sensor located inside the sensor ball; and
    (b) using the acoustic readings to find a leak in the pipeline.

10. The method of claim 9, further comprising:
    (a) the sensor ball sends information about a location of the leak to the healing ball;
    (b) the healing ball ejects a healing fluid;
    (e) the healing fluid flows through the pipeline to the leak location; and
    (d) the healing fluid seals the leak.

11. The method of claim 8, wherein, for each ball, at least one opening is located on an upper side of the ball facing an inlet direction and at least one opening is located on a lower side of the ball facing an outlet direction.

12. The method of claim 8 comprising at least two healing balls and at least two sensor balls.

13. The method of claim 8 wherein the sensor ball is released into the pipeline and at a predetermined time later, the healing ball is released into the pipeline.

14. The method of claim 8 wherein the sensor ball sends information about a location of the leak through a means selected from the group consisting of: SONAR, Bluetooth, Zigbee, or Wi-Fi and wherein the sensor ball is tethered to the healing ball.

* * * * *